United States Patent
Zakowski (10) Patent No.: US 9,615,695 B2
(45) Date of Patent: Apr. 11, 2017

(54) FOOD PROCESSOR HAVING REMOVABLE FEED TUBE

(71) Applicant: Joseph W. Zakowski, New Canann, CT (US)

(72) Inventor: Joseph W. Zakowski, New Canann, CT (US)

(73) Assignee: CONAIR CORPORATION, Stamford, CT (US)

( * ) Notice: Subject to any disclaimer, the term of this patent is extended or adjusted under 35 U.S.C. 154(b) by 292 days.

(21) Appl. No.: 14/245,275

(22) Filed: Apr. 4, 2014

(65) Prior Publication Data

US 2014/0299692 A1    Oct. 9, 2014

Related U.S. Application Data

(60) Provisional application No. 61/809,556, filed on Apr. 8, 2013.

(51) Int. Cl.
*A47J 43/00* (2006.01)
*A47J 43/07* (2006.01)

(52) U.S. Cl.
CPC ................... *A47J 43/0716* (2013.01)

(58) Field of Classification Search
CPC .................................. A47J 43/0716
USPC ................................. 241/92, 285.2
See application file for complete search history.

(56) References Cited

U.S. PATENT DOCUMENTS

| | | | | |
|---|---|---|---|---|
| 3,032,087 A | * | 5/1962 | Rodwick | A47J 43/255 241/245 |
| 4,397,427 A | * | 8/1983 | Howard | B26D 7/0641 241/282.1 |
| 5,042,731 A | * | 8/1991 | Ford | A47J 42/40 193/32 |
| 5,819,641 A | * | 10/1998 | Hsu | A47J 19/027 241/282.1 |
| 8,146,490 B2 | * | 4/2012 | Obersteiner | A47J 19/027 241/273.2 |
| 8,387,520 B2 | * | 3/2013 | Backus | A47J 19/027 241/37.5 |
| 2005/0127086 A1 | * | 6/2005 | Bradshaw | A47J 43/0794 221/144 |
| 2006/0130676 A1 | * | 6/2006 | Cohen | A47J 43/0716 99/511 |
| 2011/0083566 A1 | * | 4/2011 | Backus | A47J 19/027 99/511 |

\* cited by examiner

*Primary Examiner* — Faye Francis
(74) *Attorney, Agent, or Firm* — Grogan, Tuccillo & Vanderleeden, LLP (57) ABSTRACT

A food processor having a removable feed tube is provided. The food processor includes a work bowl and a lid configured to be selectively removable from the work bowl and having a feed tube opening. A removable feed tube is selectively attached to the lid and extends upwards from the feed tube opening when attached to the lid. The food processor also includes a simple cover that can be utilized in place of the removable feed tube to close off the feed tube opening.

6 Claims, 10 Drawing Sheets

FOOD PROCESSOR HAVING REMOVABLE FEED TUBE

CROSS-REFERENCE TO RELATED APPLICATIONS

This application claims the benefit of U.S. Provisional Application Ser. No. 61/809,556, filed on Apr. 8, 2013, which is herein incorporated by reference in its entirety.

FIELD OF THE INVENTION

The present invention relates to food processors and, more particularly, to a food processor having a removable feed tube.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and functionality.

SUMMARY OF THE INVENTION

It is an object of the present invention to provide a food processor having a removable feed tube.

These and other objects are achieved by the present invention.

According to an embodiment of the present invention, a food processor having a removable feed tube is provided. The food processor includes a work bowl and a lid configured to be selectively removable from the work bowl and having a feed tube opening. A removable feed tube is selectively attached to the lid and extends upwards from the feed tube opening when attached to the lid. The food processor also includes a simple cover that can be utilized in place of the removable feed tube to close off the feed tube opening.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
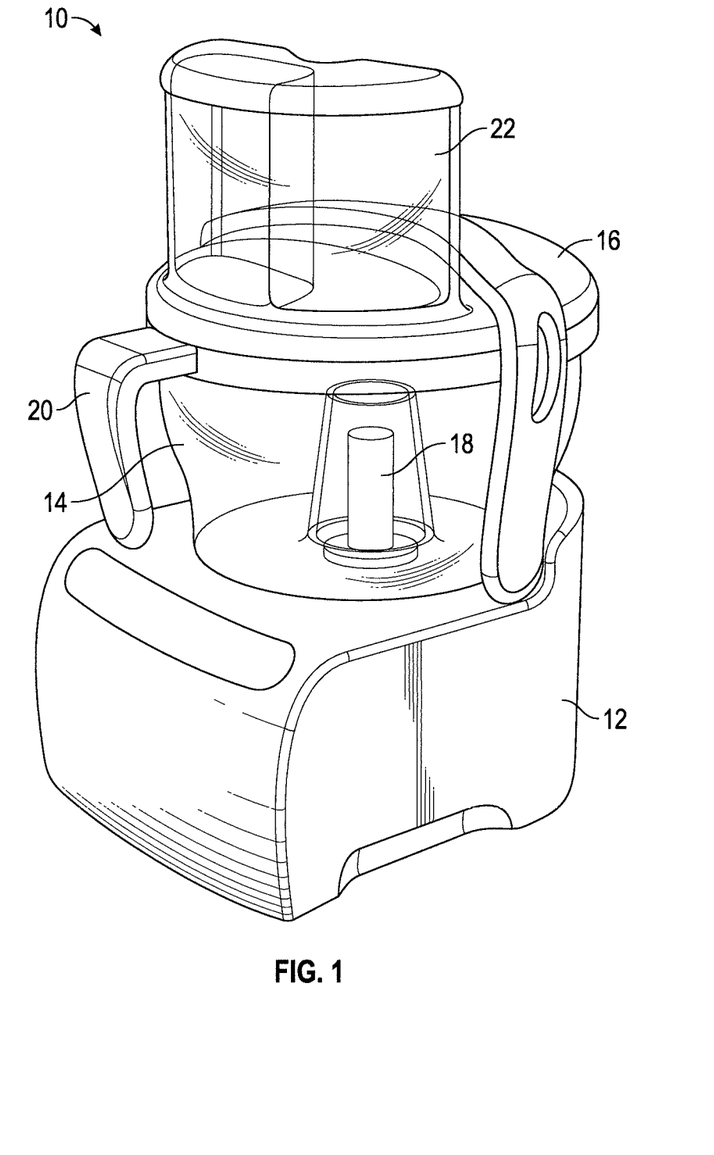
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
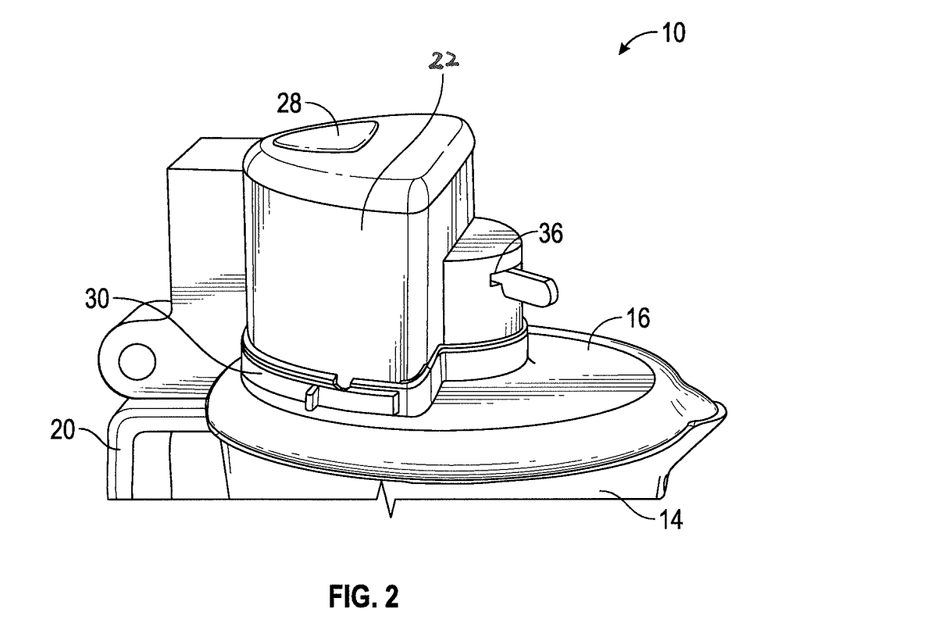
FIG. 2 is an enlarged, perspective view of a food processor having a removable feed tube, according to an embodiment of the present invention.
Figure 3:
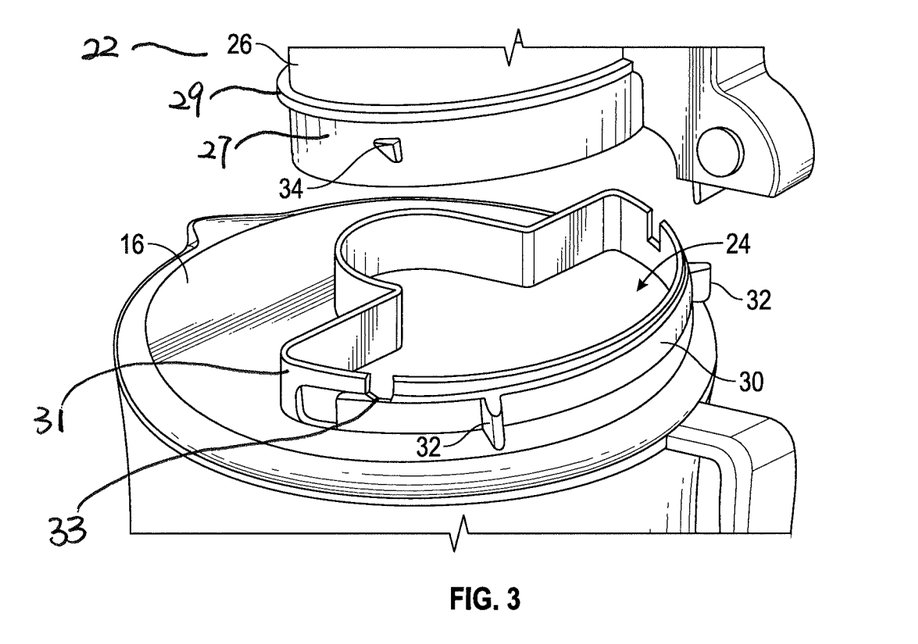
FIG. 3 is an enlarged, perspective view of the food processor having a removable feed tube of FIG. 2, illustrating removal of the feed tube.

With reference to FIGS. 2 and 3, an enlarged view of the lid 16 of the food processor 10 is shown. As shown therein, and as noted above, the lid 16 includes a feed tube opening 24 and a removable feed tube 22 configured to be selectively attached to the lid 16 and in communication with the feed tube opening 24. In particular, the feed tube 22 may be slidably received by the feed tube opening 24. The removable feed tube 26 may also include a feed tube cover 28 for closing off the feed tube 22, as desired. As shown therein, the feed tube 22 and feed tube cover are sized and shaped to correspond to the size and shape of the feed tube opening 24.

As shown in FIG. 3, the feed tube 22 includes a body portion 26, a feed tube flange 27, and a skirt 29. The feed tube flange 27 is disposed in adjacent to and on the bottom of the body portion. The skirt 29 locates between the body portion 26 and the feed tube flange 27, and extending outward horizontally therefrom. A peripheral flange 31 locates on the circumference of the feed tube opening, and extend upwardly therefrom. When the feed tube 22 is attached to the lid 16, the body portion is slidably received in the feed tube opening 24 on the lid 16. The feed tube flange 27 is selectively received by the feed tube opening 24 and contacts the inner of the peripheral flange 31 of the feed tube opening 24. The skirt 29 sits on the upper edge of the peripheral flange 31, limiting the travel the feed tube 22 with respect to the feed tube opening 24.

As best shown in FIGS. 2 and 3, the lid 16 includes a ring latch 30 having grasping protrusions 32. The ring latch is disposed on the outer surface of the peripheral flange 31 and selectively couples to the peripheral flange 31 of the lid 6. The ring latch 30 is configured to be slidable from a first position to a second position for selectively and securely attaching the removable feed tube 22 to the lid 16 via its engagement with at least one locking protrusion 34. In particular, when the feed tube flange 27 is received in the feed tube opening 24 and contacts the inner surface of the peripheral flange 31 of the lid 16, at least one locking protrusion 34 extending outwardly from the feed tube flange 27 is received by a notch 33 on the ring latch 30. The ring latch 30 is configured to move from a first position to a second position where the locking protrusion 34 on an outer periphery of the removable feed tube 22 is secured to the peripheral flange 31 via the engagement between the locking protrusion 34 and the ring latch 30. The feed tube 22 is thereby secured to the lid 16.

As shown in FIG. 2, the lid 16 may also include a built-in slicing disc adjustment mechanism 36 that allows a user to vary slice thickness when the food processor is used in combination with a slicing disc assembly.

Figure 4:
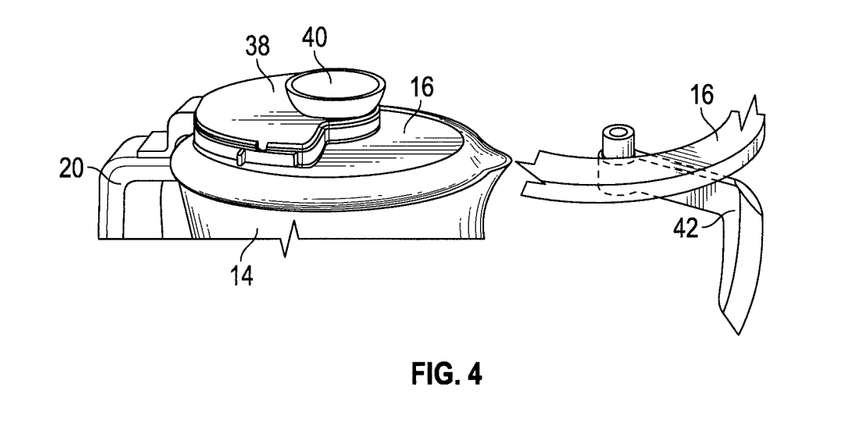
FIG. 4 is an enlarged, perspective view of the food processor of FIG. 2, illustrating a simple cover over the feed tube opening.
Figure 5:
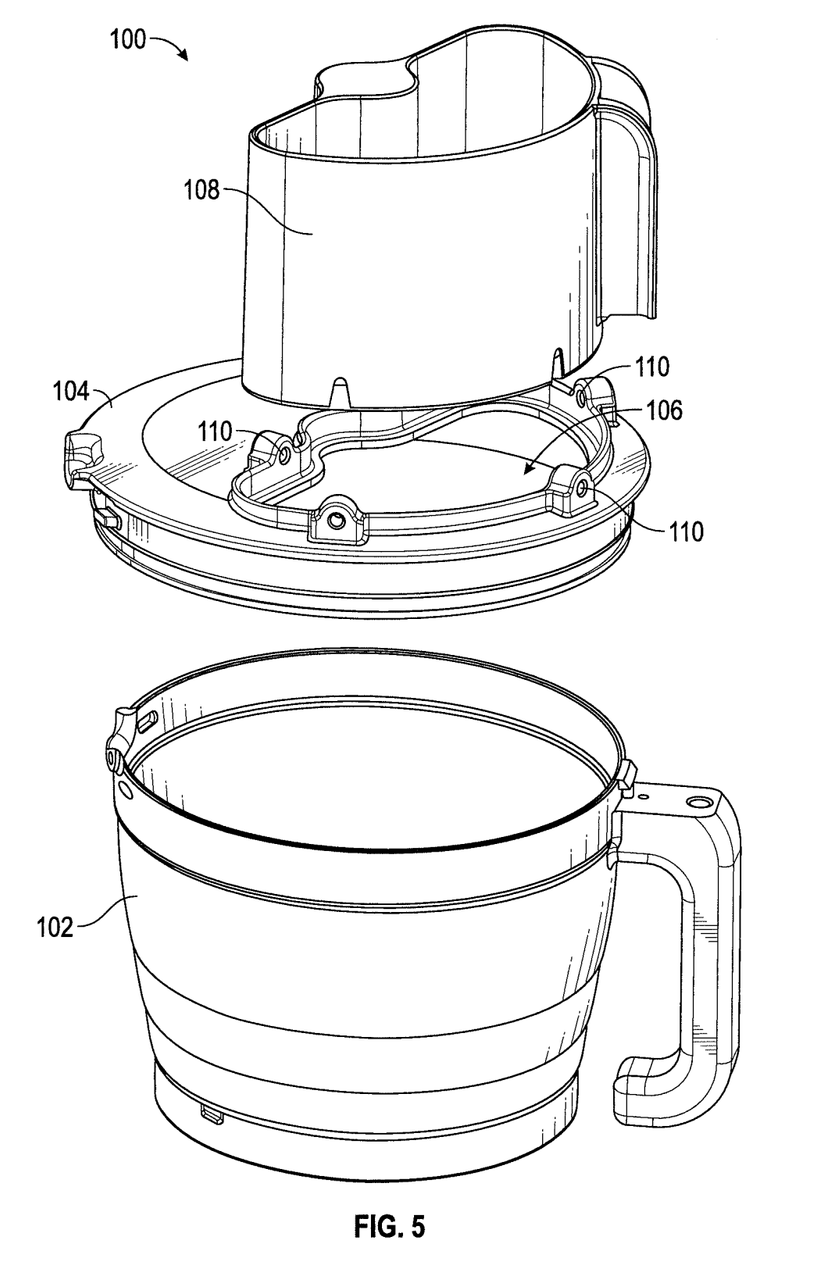
FIG. 5 is an exploded, perspective view of a food processor having a removable feed tube according to another embodiment of the present invention.
Figure 6:
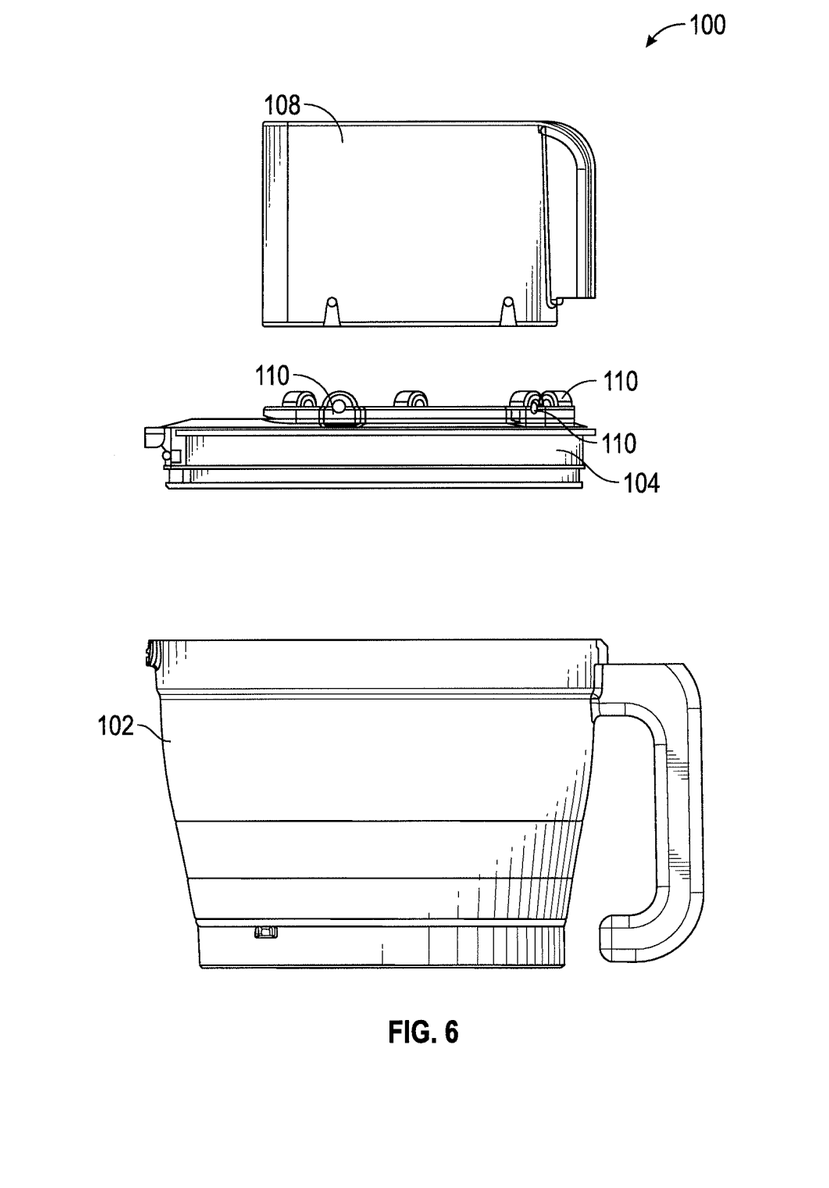
FIG. 6 is a side, elevational view of the food processor having a removable feed tube of FIG. 5.
Figure 7:
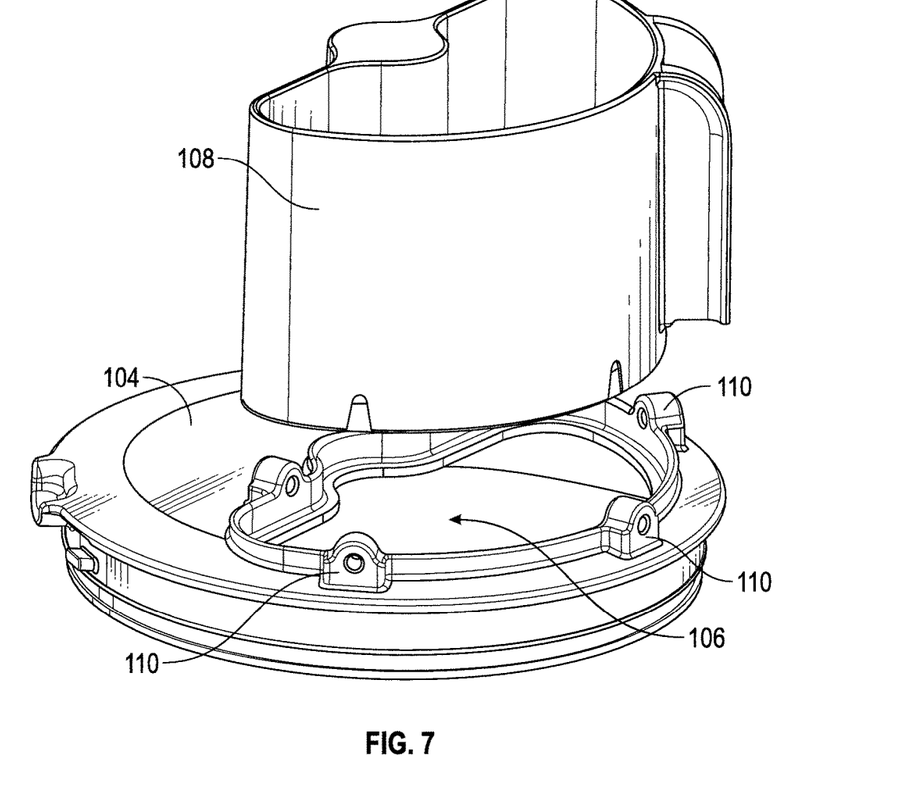
FIG. 7 is an enlarged, perspective view of a lid and removable feed tube of the food processor of FIG. 5.
Figure 8:
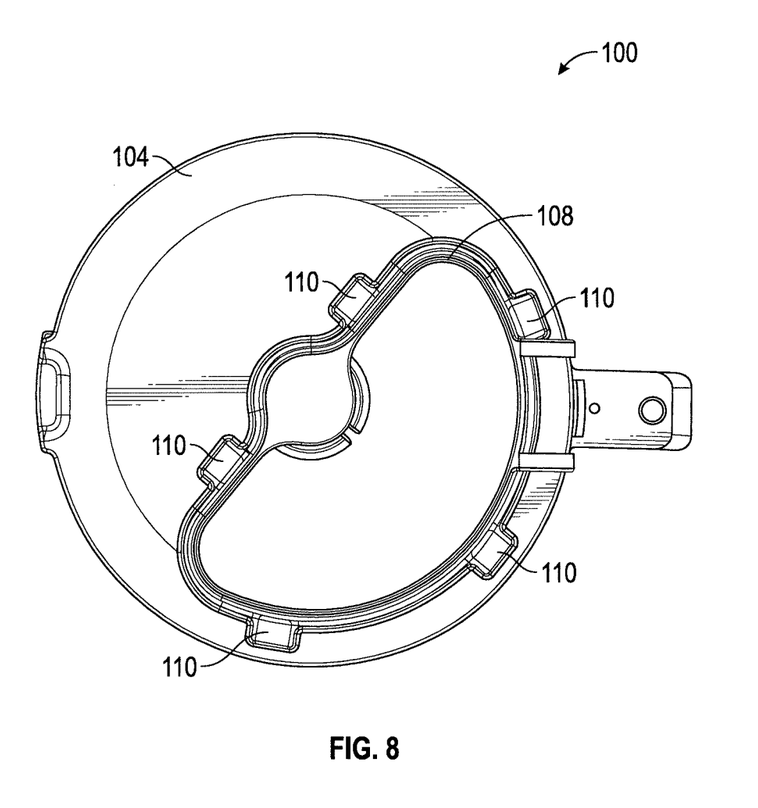
FIG. 8 is a top, plan view of the food processor having a removable feed tube of FIG. 5.
Figure 9:
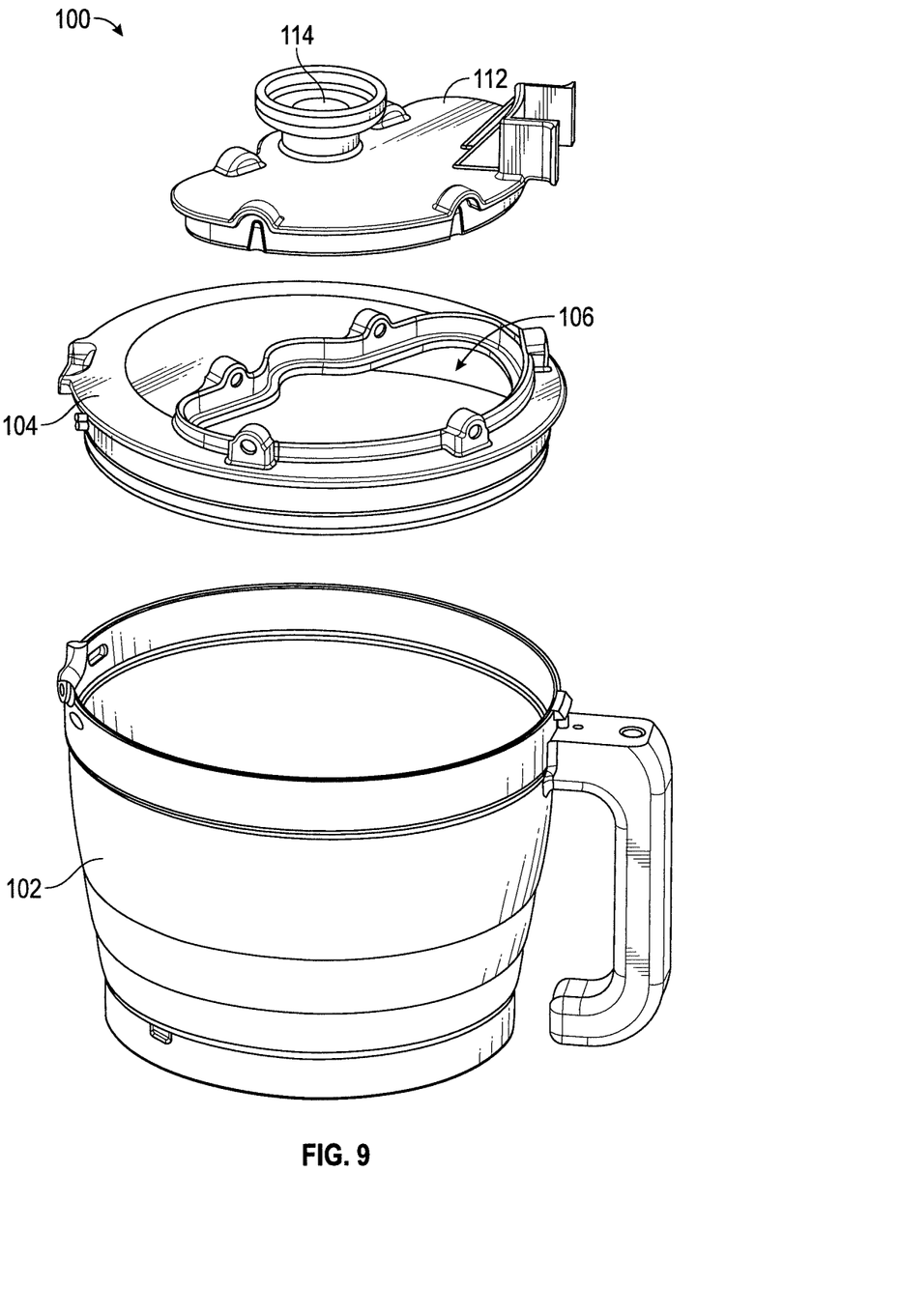
FIG. 9 is an exploded, perspective view of the food processor of FIG. 5, illustrating a cover for the feed tube opening.
Figure 10:
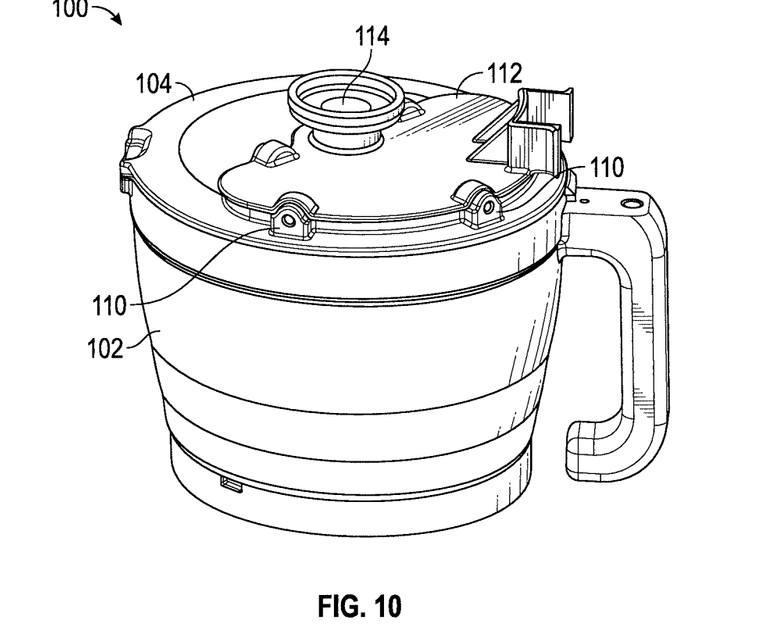
FIG. 10 is a perspective view of the food processor of FIG. 5, illustrating a cover in place over the feed tube opening.
Figure 11:
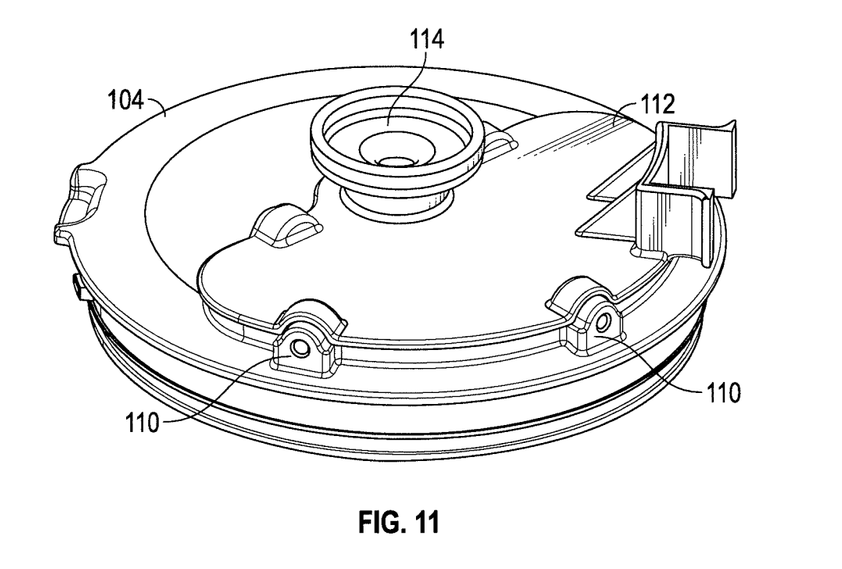
FIG. 11 is an enlarged, perspective view of the lid of the food processor of FIG. 5, illustrating a cover in place over the feed tube opening.
Figure 12:
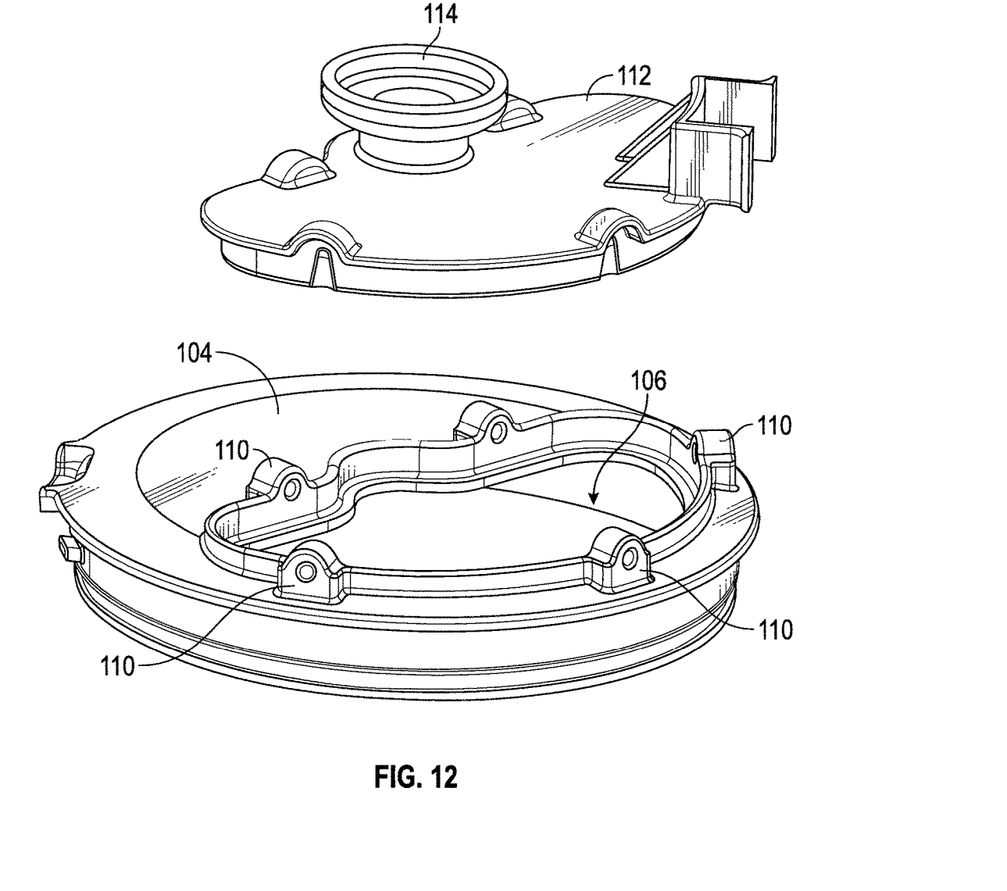
FIG. 12 is another perspective view of the lid of the food processor of FIG. 5, illustrating a cover for closing off the feed tube opening.

Turning now to FIG. 4, a simple cover 38 may be placed over the feed tube opening 24 when the feed tube 22 is not utilized. As will be readily appreciated, the cover 38 may be selectively attached to the lid 16 utilizing the ring latch 30, in the same manner as described above. The cover 38 may include a knob 40 which can be removed by a user to gain access to the interior of the work bowl 14 for adding liquids and the like. In addition, the knob 40 may also be utilized to attach a spatula 42.

Turning now to FIGS. 5-8 an alternative food processor 100 having a removable feed tube is shown. As with the food processor 10 described above, food processor 100 includes a work bowl 102 and a lid 104 configured to be selectively attached to the work bowl 102. The lid 16 includes a frame defining a feed tube opening 106 and removable feed tube 108 defining a substantially annular body configured to be releasably attached to the lid 104 and extending upwards from the feed tube opening 106.

As shown therein, removable feed tube 108 may be positioned on the lid 104 over the feed tube opening 106 and secured in place via pins provided through locating and anchoring apertures 110 formed in the lid 104, although other securement means known in the art may also be utilized without departing from the broader aspects of the present invention.

With reference to FIGS. 9-12, a removable cover 112 may be secured to the lid 104 over the feed tube opening 106, in place of the removable feed tube 108 during certain processing operations. The cover 112 is generally planar in configuration and may be selectively attached to the lid 104 via pins provided through the locating and anchoring apertures 110, as described above, although other securement means known in the art may also be utilized without departing from the broader aspects of the present invention. As further shown therein, the cover 112 may include a removable knob or plug 114 which can be selectively removed by a user to gain access to the interior of the work bowl 102 for adding liquids and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;
   an output shaft operatively connected to said motor and extending outwardly from said base, said output shaft being rotatable upon actuation of said motor;
   a work bowl received on said base;
   a lid removably received by said work bowl, said lid having an upstanding, peripheral flange defining a feed tube opening;
   a ring latch slidably coupled to the outer surface of said peripheral flange of said feed tube opening;
   a feed tube releasably connected to said lid and in fluid communication with said feed tube opening.

2. The food processor of claim 1, wherein:
   said feed tube includes a body portion and a feed tube flange disposed about said body portion;
   wherein said body portion of said feed tube is slidably received in said feed tube opening; and
   wherein said feed tube flange selectively contacts said peripheral flange of said feed tube opening,
   wherein a skirt disposed between said feed tube flange and said body portion operatively sits on the upper edge of said peripheral flange of said feed tube opening to limit travel of said feed tube with respect to said feed tube opening.

3. The food processor of claim 1, wherein:
   said feed tube includes a feed tube cover removably received by said feed tube, said feed tube cover being configured to selectively close off said feed tube.

4. The food processor of claim 2,
   wherein said feed tube includes at least one locking protrusion extending outwardly from said feed tube flange; and
   wherein said ring latch is selectively movable to engage said locking protrusion to secure said feed tube to said lid.

5. The food processor of claim 1, wherein:
   said ring latch includes at least on grasping protrusion extending outwardly therefrom in a radial direction perpendicular to an axis of rotation of said output shaft.

6. The food processor of claim 1, further comprising:
   an adjustment mechanism operatively connected to said lid, said adjustment mechanism being configured to selectively vary a slice thickness of food entering said feed tube.

* * * * *